UNITED STATES PATENT OFFICE.

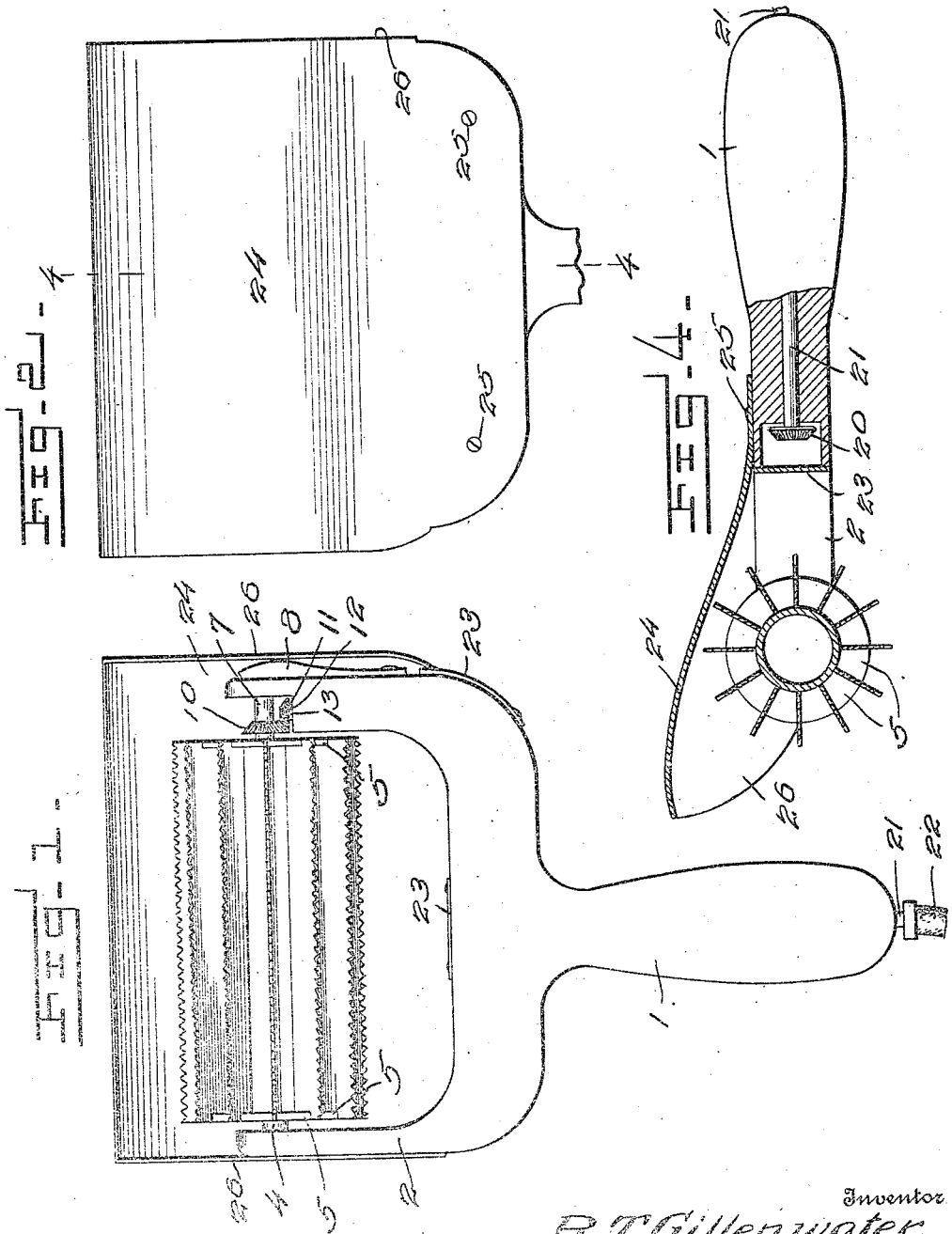

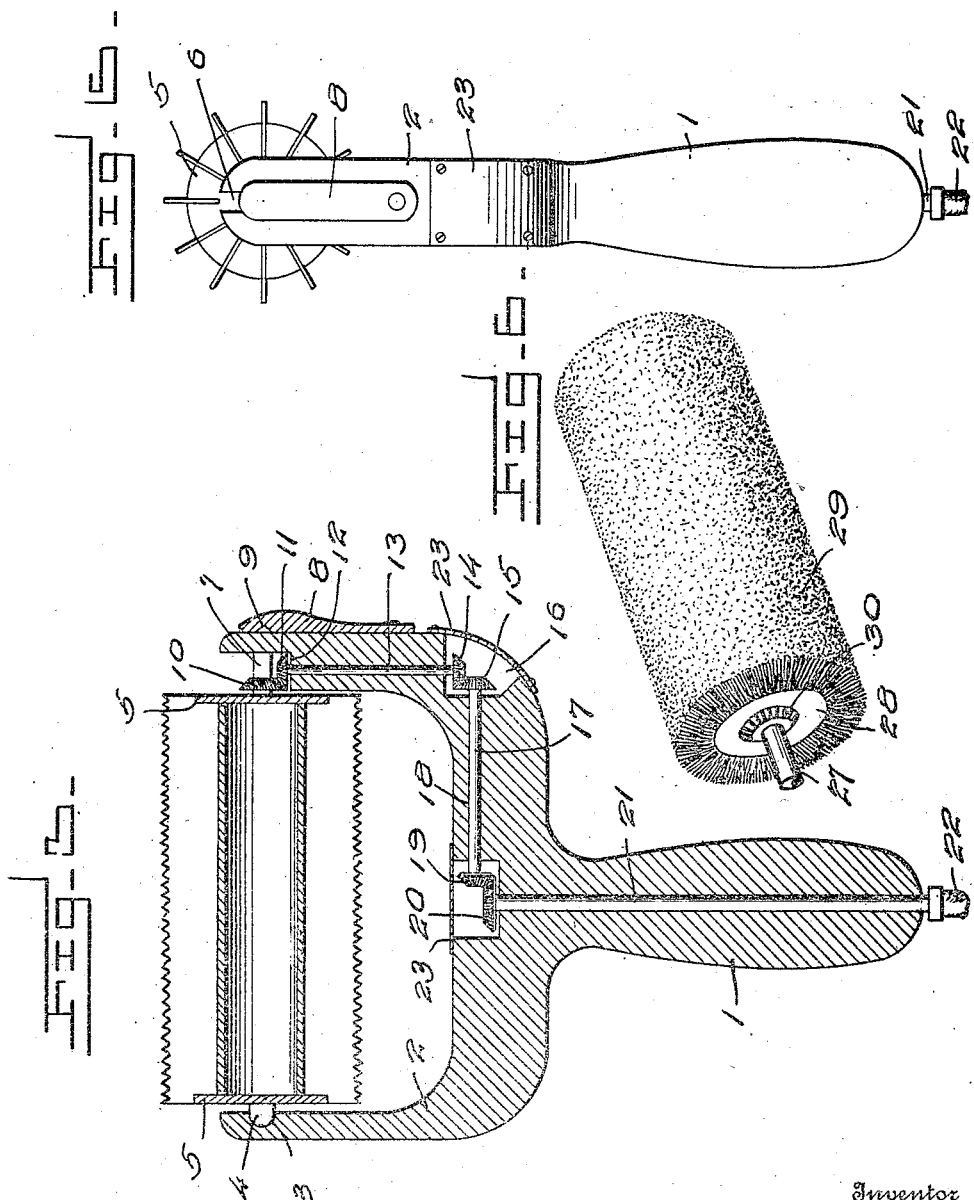

ROBERT T. GILLENWATER, OF ROGERSVILLE, TENNESSEE.

CURRYCOMB.

1,008,322.   Specification of Letters Patent.   Patented Nov. 14, 1911.

Application filed April 26, 1911. Serial No. 623,339.

*To all whom it may concern:*

Be it known that I, ROBERT T. GILLENWATER, a citizen of the United States, residing at Rogersville, in the county of Hawkins and State of Tennessee, have invented certain new and useful Improvements in Currycombs, of which the following is a specification.

My invention relates to improvements in curry combs and has for its leading object the provision of an improved form of rotary curry comb.

A further object of my invention is the provision of an improved form of rotary curry comb adapted to be driven through the medium of a flexible drive cord or chain and which will quickly and easily clean the horse or other animals to be groomed and will so discharge the hair or other material removed as to prevent said material from being thrown over the clothes or into the face of the person using my improved curry comb.

Another object of my invention is the provision of an improved power operating rotary curry comb from which the tooth bearing currying roller may be readily removed and a brush bearing roller substituted which will mesh with and be driven by the gearing of the currying frame to drive the brush and thus facilitate the completion of the grooming of the animal.

Other objects and advantages of my improved grooming device will be readily apparent from the following description taken in connection with the accompanying drawings, and it will be understood that I may make any modifications in the specific structure shown and described in the scope of my claims without departing from the spirit of the invention.

Figure 1 represents a front view of my complete device. Fig. 2 represents a rear view thereof. Fig. 3 represents a sectional view of the device. Fig. 4 represents a sectional view on the line 4—4 of Fig. 2. Fig. 5 represents an end view of the curry comb with protecting casings removed, and Fig. 6 represents a perspective view of a member adapted to be substituted for the curry comb.

In the drawings, the numeral 1 designates the tubular handle of the frame of my curry comb having at its upper end the yoke or bifurcated portion 2 having one of the furcations formed with the hemispherical depression 3 on the inner side of for engaging the rounded end 4 of the comb shaft to which are secured the plates 5 of the rotary curry comb. The other furcation of the handle has the slot 6 formed therein to receive the end 7 of the comb shaft, while secured to the said furcation is the curved spring member 8 having conoid bearing recess 9 to engage the pointed end of the shaft, this spring member thus normally holding the shaft and thus the curry comb proper in position in the frame of the handle.

Secured on the shaft is the miter gear 10 which is in mesh with the miter gear 11 which rests on the shoulder 12 of the spring bearing furcation, said gear 11 being secured to the upper end of the shaft 13 which journaled in the furcation and has on its lower end the miter 14 fitting in the recess 15 of the yoke 2 and being in mesh with the miter 16 of the shaft 17 which is journaled in the integral brackets 18 of the yoke. Said shaft 17 has on its other end the miter gear 19 in mesh with the miter 20 on the end of the shaft 21 which is journaled in the tubular handle 1, a suitable flexible drive cord 22 being secured to the shaft 21 for rotating its shaft and thus through the various shafts and miter gears the rotary curry comb.

Fitting over the recesses of the yoke 2 in which the various miter gears are contained are the cap plates 23 which thus prevent the material loosened by the comb from dropping into the gears and clogging the same to prevent their operation, while to prevent said material from being thrown into the face of the person using the comb, I secure to the yoke 2 the protector plate 24 having openings therein through which pass the securing screws 25, said plate fitting closely around the handle 1 and having end sections 26 which fit over the ends of the yoke, the plate curving upward partly around the curry comb proper but leaving a portion of the comb projecting to engage the animal to be groomed.

When it is desired to remove the currying roller, I first remove the protector plate and then force the spring 8 outward until the shaft 7 is disengaged by the recess 9, when the end of the curry comb roller may be swung upward and the rounded end 4 of the shaft then withdrawn from the recess 3. I then place in said recess 3 the rounded end of the shaft 27 of the roller 28 bearing the bristles 29 and I fit the other end of the shaft into the slot 6 and lock it there by the spring 8, the roller and shaft 27 having a miter gear 30 secured thereto to mesh with the gear 11 of the frame, whereby the brush roller is secured in the frame and driven in the same way as currying roller.

From the foregoing description taken in connection with the drawing, the construction and operation of my improved grooming device will be readily understood, and it will be seen that I have provided a simple, efficient and durable device in which the currying roller is positively driven through the mediums of suitable shafts and gearings, and in which I employ improved means for retaining the curry comb roller in position, which means permit of the ready removal of the currying roller or the substitution of my improved brush bearing roller when desired.

I claim:

1. The combination with a frame, having a bifurcated upper end, one of the furcations of the frame having a rounded recess formed therein and the other furcation having a longitudinally disposed slot formed in it, of a grooming roller having a shaft with a rounded end for engagement in the recess and having a shaft with a pointed end projecting through the slot of the other furcation, a spring member secured to the frame and having a conoid recess formed in its end to engage the pointed end of the shaft, a miter gear secured on the shaft, and gearing carried by the frame and meshing with said miter gear of the shaft for rotating the grooming roller.

2. The combination with a bifurcated frame having a recess formed in one of its furcations, of a grooming roller having an end fitting in said recess, a spring device secured to the other furcation and having a conoid recess formed therein to engage the other end of the roller, a miter gear carried by the roller, a vertically disposed shaft journaled in one of the furcations and bearing a miter gear on one end in mesh with the miter of the roller and having a miter gear on its other end fitting in a recess formed in the frame, a transversely disposed shaft journaled in the frame and having one end projecting into the gear containing recess, a miter gear secured on the projecting end of the shaft and in mesh with the miter of the vertical shaft, the frame having a recess formed therein into which the other end of the shaft projects, said recess being disposed centrally of the yoke of the frame, a miter gear secured on the other end of the shaft, and disposed in said recess, a shaft journaled in the frame and having a miter gear in mesh with the latter gear of the shaft, for driving the same, a flexible driving cord secured to the shaft of the frame, and cap plates covering the recesses of the frame to prevent clotting of the miter gears.

3. A curry comb, comprising a handle having furcations each formed with a bearing, a roller bearing currying teeth and having shafts projecting from its end for engagement in the bearings, a resilient member secured to the frame and engaging the end of one of the shafts for locking the shaft within the bearings of the frame, a miter gear carried by one of the shafts, gearing in mesh with said miter gear for rotating the currying rollers, the frame having recesses formed therein in which the various gears lie, and cap plates covering the recesses for preventing clogging of the gearing.

In testimony whereof I affix my signature, in the presence of two witnesses.

ROBERT T. GILLENWATER.

Witnesses:
L. R. BAKER,
W. F. STURM.